US010453491B2

(12) United States Patent
Oxholm et al.

(10) Patent No.: US 10,453,491 B2
(45) Date of Patent: Oct. 22, 2019

(54) VIDEO PROCESSING ARCHITECTURES WHICH PROVIDE LOOPING VIDEO

(71) Applicant: Adobe Inc., San Jose, CA (US)

(72) Inventors: Geoffrey Oxholm, Albany, CA (US); Elya Shechtman, Seattle, WA (US); Oliver Wang, Seattle, WA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/273,981

(22) Filed: Feb. 12, 2019

(65) Prior Publication Data

US 2019/0189158 A1 Jun. 20, 2019

Related U.S. Application Data

(63) Continuation of application No. 15/661,546, filed on Jul. 27, 2017, now Pat. No. 10,204,656.

(51) Int. Cl.
*G11B 27/00* (2006.01)
*H04N 7/01* (2006.01)
*G06K 9/00* (2006.01)
*G06K 9/46* (2006.01)

(52) U.S. Cl.
CPC ........ *G11B 27/007* (2013.01); *G06K 9/00718* (2013.01); *G06K 9/00744* (2013.01); *G06K 9/00765* (2013.01); *G06K 9/4609* (2013.01); *H04N 7/0117* (2013.01); *H04N 7/0142* (2013.01); *G06K 2009/00738* (2013.01)

(58) Field of Classification Search
CPC ............ G11B 27/007; G06K 9/00718; G06K 9/00744; G06K 9/00765; G06K 9/4609; G06K 2009/00738; H04N 7/0117; H04N 7/0142
See application file for complete search history.

(56) References Cited

U.S. PATENT DOCUMENTS

2017/0054909 A1 2/2017 Iancu
2017/0117016 A1 4/2017 Hoppe et al.

OTHER PUBLICATIONS

"Video Textures", Georgia Tech College of Computing, Georgia Tech's Computational Perception Library, May 16, 2002, downloaded from http://www.cc.gatech.edu/cpl/projects/videotexture, retrieved on Jul. 27, 2017.
U.S. Appl. No. 15/661,546, filed Jul. 27, 2017, Patented Jun. 19, 2019.

*Primary Examiner* — Huy T Nguyen
(74) *Attorney, Agent, or Firm* — Brake Hughes Bellermann LLP

(57) ABSTRACT

Provided are video processing architectures and techniques configured to generate looping video. The video processing architectures and techniques automatically produce a looping video from a fixed-length video clip. Embodiments of the video processing architectures and techniques determine a lower-resolution version of the fixed-length video clip, and detect a presence of edges within image frames in the lower-resolution version. A pair of image frames having similar edges is identified as a pair of candidates for a transition point (i.e., a start frame and an end frame) at which the looping video can repeat. Using start and end frames having similar edges mitigates teleporting of objects displayed in the looping video. In some cases, teleporting during repeating is eliminated.

20 Claims, 15 Drawing Sheets

300

500
Con't

500
Con't

VIDEO PROCESSING ARCHITECTURES WHICH PROVIDE LOOPING VIDEO

CROSS-REFERENCE TO RELATED APPLICATION

This application is a continuation application and claims the benefit of U.S. application Ser. No. 15/661,546, filed on Jul. 27, 2017 and titled "VIDEO PROCESSING ARCHITECTURES WHICH PROVIDE LOOPING VIDEO", all of which is incorporated herein by reference in its entirety.

TECHNICAL FIELD

This disclosure relates generally to systems and techniques used to process images, and more particularly relates to providing looping video.

BACKGROUND

In video processing and use, it is often desirable to create a repeating video. Conventional techniques for creating a repeating video produce repeating videos which, upon reaching an end and restarting, do so in a manner which appears rough, jumpy, and unnatural. Some conventional techniques generate videos which appear to teleport at least one depicted object during the transition from the end of the video to the start of the video. Teleportation results from misalignment of an object in an end frame of the video relative to a position of the object in a start frame of the video. Conventional techniques for creating a repeating video can cause teleportation for various reasons, such as changes in lighting of the object between the end frame of the video and the start frame of the video. For example, some conventional techniques generate a repeating video of a pendulum which, upon reaching an end and restarting, suddenly appears to reverse direction mid-swing. Conventional techniques also require high levels of processing power due to processing large amounts of data. For example, conventional techniques for creating a repeating video can require dozens of iterations of analyzing all pixels in all frames of a candidate video to be converted into the repeating video.

SUMMARY

Systems and techniques are disclosed that provide looping video. In an example, a method includes converting a high-resolution video clip, having a plurality of higher-resolution frames, to a lower-resolution video clip having a plurality of lower-resolution frames. The method also includes creating a plurality of edgemaps of the plurality of lower-resolution frames by performing edge detecting on the plurality of lower-resolution frames, as well as forming, using the plurality of lower-resolution frames and the plurality of edgemaps, a confusion matrix that identifies pixels that are parts of edges. The method additionally includes generating a filtered confusion matrix by convolving the confusion matrix with a diagonal filter, and determining a candidate transition point by identifying a minimum value in the filtered confusion matrix. The method also includes rendering a candidate looping video from the high-resolution video clip, where the candidate looping video has a start frame and an end frame corresponding to the candidate transition point.

These illustrative features are mentioned not to limit or define the disclosure, but to provide examples to aid understanding thereof. Additional embodiments are discussed in the Detailed Description, and further description is provided there.

BRIEF DESCRIPTION OF THE DRAWINGS

The accompanying drawings, which are included to provide a further understanding of the disclosed subject matter, are incorporated in, and constitute a part of, this specification. The drawings also illustrate examples of the disclosed subject matter, and together with the detailed description, serve to explain the principles of examples of the disclosed subject matter.

DETAILED DESCRIPTION

Figure 1:
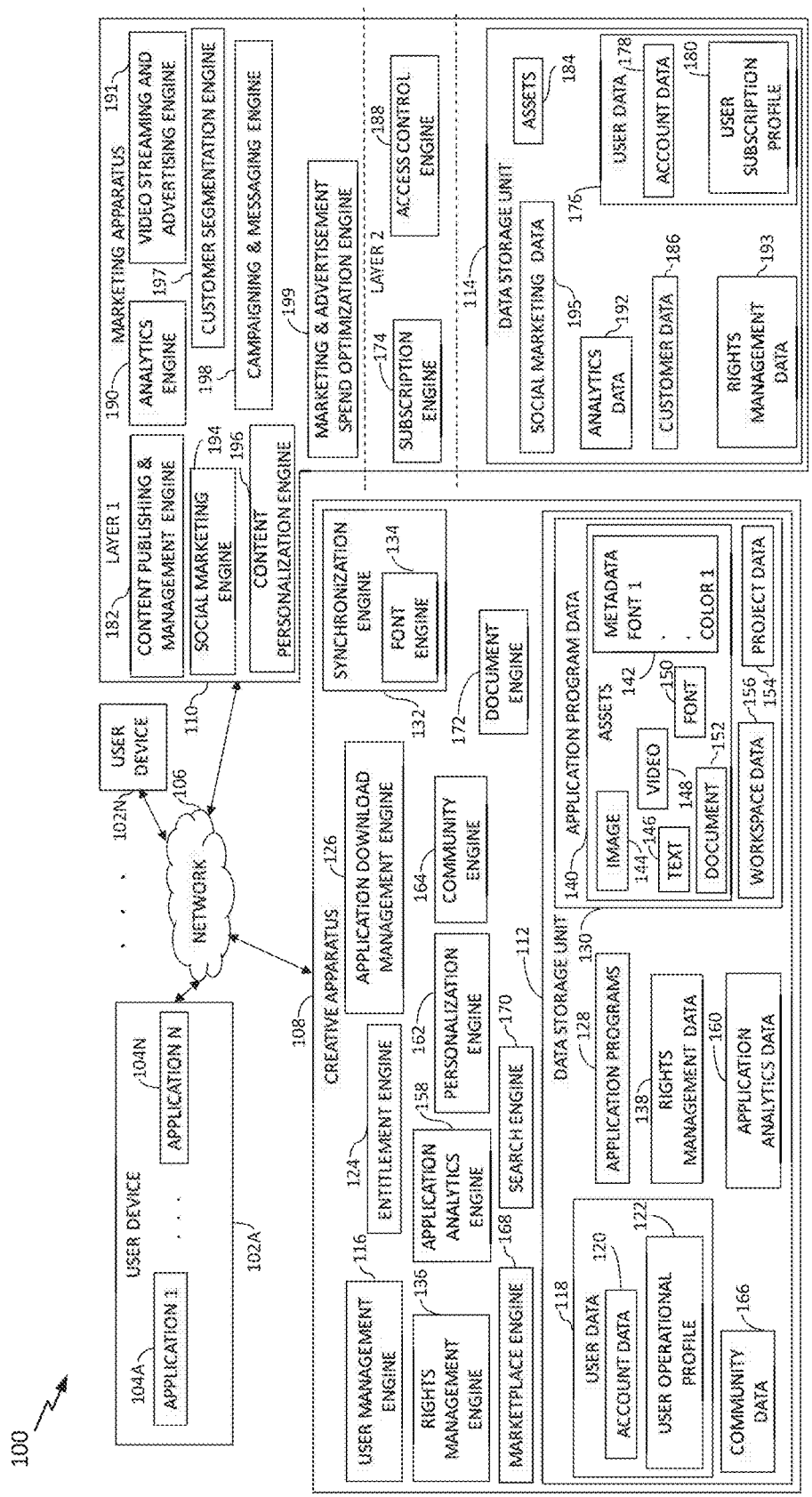
FIG. 1 is a diagram of an environment in which one or more techniques of the invention can be practiced.

The techniques disclosed herein use video processing architectures to generate looping video which, when played, appears to have an infinite duration. A looping video is a repeated series of images that plays multiple times such that after the series of images is played at one iteration, the next iteration immediately begins. For example, a looping video may be a one minute video clip of a fire that is repeatedly played on a screen in a hotel lobby to provide the appearance of a fire. Looping video has many applications, such as providing ambiance in a public location, such as a restaurant, or a private location, such as a home.

Provided are techniques for automatically producing and/or suggesting a looping video from a fixed-length video clip. In one embodiment, a portion of the fixed length video clip is selected for use in creating a looping video by intelligently selecting similar starting and ending frames for the portion from the video that will be repeated. Examples of the techniques determine a lower-resolution version of the fixed-length video clip, and detect a presence of edges within image frames in the lower-resolution version. A pair of image frames having similar edges are identified as a pair of candidates for a transition point (i.e., a start frame and/or an end frame) at which an output looping video can repeat. Unlike conventional techniques that identify starting and/or ending frames based on the full resolution of the video clips, techniques of the invention use low-resolution versions of the clips. The low-resolution versions of the clips can be full-frame or can be less-than-full-frame. Applying various filters (e.g., edge mask filtering and matrix comparison techniques) to the low-resolution frames allows frames that have similar edge features to be more accurately and efficiently identified as transition points (e.g., as starting an ending frames) than with convention techniques. Thus, using the low-resolution frames and appropriate filtering/comparison techniques can deprioritize global effects (e.g., changes in illumination), and prioritize local alignment of objects in the image frames. Using start and end frames having similar edges can improve results by mitigating teleporting in the looping video. In some cases, teleporting during repeating is eliminated.

In embodiments, the techniques can identify, in a fixed-length video clip, at least one pair of candidate image frames as a transition point. In embodiments, the techniques can identify at least one pair of candidate image frames as a transition point between more than one fixed-length video clip. Thus, the provided techniques can determine at least one candidate transition point between at least two different videos. In an example where a transition point is determined between two different videos, the two different videos can be spliced at the transition point and can be (1) looped at the transition point; or (2) not looped at the transition point.

These techniques, as well as other techniques (i.e., technical solutions) described herein can be implemented, as is practicable, individually or in combination to form different systems (e.g., video processing architectures) for providing looping video which, when played, appears to have an infinite duration. In embodiments, the provided technical solutions address and improve upon the technical problems of the conventional techniques, and also provide several beneficial advantages. The provided technical solutions can beneficially and advantageously produce looping video which appears natural and composed in a manner which has minimal (or no) teleporting. The provided technical solutions can provide looping video which is more accurate. Additionally, the provided technical solutions can beneficially and advantageously produce looping video by comparing a fewer number of frames than conventional techniques. Further, the provided technical solutions can beneficially and advantageously produce looping video in a faster manner, using fewer processor cycles and less energy than conventional techniques. Thus, the provided methods and apparatuses can advantageously and beneficially improve on conventional techniques, and can improve functioning of a machine which is configured to provide looping video. Further details about how these advantages are achieved are described herein in reference to the figures.

Terminology

The following examples of terminology are provided to assist in comprehending the current disclosure, and are not provided as limitations.

As used herein, the phrase "computing device" refers to any electronic component, machine, equipment, or system that can be instructed to carry out operations. Computing devices will typically, but not necessarily, include a processor that is communicatively coupled to a memory and that executes computer-executable program code and/or accesses information stored in memory or other storage. Examples of computing devices include, but are not limited to, desktop computers, laptop computers, server computers, tablets, telephones, mobile telephones, televisions, portable data assistant (PDA), e-readers, portable game units, smart watches, etc.

A "confusion matrix," as described herein, is a matrix of data indicating a quantity of difference, at a pixel level, between two images. A confusion matrix can be used to identify a most similar image pair from a group of images by (1) preparing the confusion matrix from video frames and edgemaps derived from those video frames, and then (2) identifying a minimum value in the confusion matrix to identify a minimum level of differences between two images. The confusion matrix indicating the minimum level of differences corresponds to the two images, in the group of images, which are most similar.

"Content," as described herein, includes electronic content. Examples of the content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

A "digital experience," as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content.

A "digital tool," as described herein, includes a tool that is used for performing a function or a workflow electronically. Examples of the digital tool include, but are not limited to, a content creation tool, a content editing tool, a content publishing tool, a content tracking tool, a content managing tool, a content printing tool, a content consumption tool, any combination of these tools, or any other tool that can be used for creating, editing, managing, generating, tracking, consuming or performing any other function or workflow related to content. Digital tools include the creative apparatus 108.

As used herein, the term "edgemap" describes a matrix of pixel data resulting from applying an edgemask to an image (i.e., performing edge detecting). An edgemap indicates locations of edges (i.e., boundaries) of objects in the image. The edgemask specifies the types of edges identified in the image, such as edges having a specific orientation, edges having a certain level of contrast, edges having a certain minimum level of discontinuity, or the like.

"Edge detecting," as described herein, is a technique to identify a location of edges in an image. Edge detecting can create an edgemap by performing a mathematical operation on the image, such as by convolving an image with an edge-detecting kernel.

As used herein, the term "high-resolution video clip" can describe both the video clip which is input to a process for creating a looping video, as well as the looping video output from the process. Reference to "high-resolution" or "higher-resolution" refers to frames of such a clip being of higher-resolution (e.g., having more pixels per inch, etc.) than to frames of another clip, such as compared to frames of a "low-resolution" or "lower-resolution" clip produced based on a high-resolution clip. In examples, a "low-resolution" clip can be full-frame or less than full-frame.

As used herein, the term "image" refers to data representing an appearance. Images can represent solid colors, patterns, real objects, artificial objects, scenes, and numerous other things. Images can be captured using cameras and other image capture devices, generated by computers, created by artists and other users, and created in various other ways. Images can be, but are not necessarily, composed of pixels arranged in a rectangular array with a certain height and width. Each pixel can consist of one or more bits of information, representing the brightness of the image and/or the color of the image at that point.

As used herein, the term "looping video" includes video of a finite duration that is played in a repetitive manner such that the video, upon reaching an end of the finite duration, immediately restarts playing at a start of the finite duration.

A "seamless loop," as described herein, includes video that, when played repetitively, appears essentially endless. In other words, when viewing a seamless loop, it is very difficult to determine a time of a transition at which video reaches an end and restarts at a beginning.

Exemplary Computing Environment

FIG. 1 is a diagram of an environment 100 in which one or more embodiments of the present disclosure can be practiced.

The environment 100 includes one or more user devices, such as a user device 102A up to a user device 102N. Each of the user device is connected to either a creative apparatus 108 or a marketing apparatus 110 or to both via a network 106. A user of the user device uses various products, applications, or services supported by the creative apparatus 108 or the marketing apparatus 110 or both via the network 106.

The user devices correspond to various users. Examples of the users include, but are not limited to, creative professionals or hobbyists who use creative tools to generate, edit, track, or manage creative content, marketing professionals who use marketing tools to generate, edit, track, or manage online content, or to manage online marketing process, end users, administrators, users who use document tools to create, edit, track, or manage documents, advertisers, publishers, developers, content owners, content managers, content creators, content viewers, content consumers, designers, editors, any combination of these users, or any other user who uses digital tools to create, edit, track, or manages digital experiences.

Digital tool, as described herein, includes a tool that is used for performing a function or a workflow electronically. Examples of the digital tool include, but are not limited to, content creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. Digital tools include the creative apparatus 108 and the marketing apparatus 110.

Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content.

Content, as described herein, includes electronic content. Examples of the content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

User Device

Examples of the user devices include, but are not limited to, a personal computer (PC), tablet computer, a desktop computer, a processing unit, any combination of these devices, or any other suitable device having one or more processors. Each user device includes at least one application supported by the creative apparatus 108 or the marketing apparatus 110.

It is to be appreciated that following description is now explained using the user device 102A as an example and any other user device can be used.

Network

Examples of the network 106 include, but are not limited to, internet, local area network (LAN), wireless area network, wired area network, wide area network, and the like.

Creative Apparatus

The creative apparatus 108 includes one or more engines for providing one or more digital experiences to the user. The creative apparatus 108 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. The creative apparatus 108 also includes a data storage unit 112. The data storage unit 112 can be implemented as one or more databases or one or more data servers. The data storage unit 112 includes data that is used by the engines of the creative apparatus 108.

A user of the user device 102A visits a webpage or an application store to explore applications supported by the creative apparatus 108. The creative apparatus 108 provides the applications as a software as a service (SaaS), or as a standalone application that can be installed on the user device 102A, or as a combination. The user creates an account with the creative apparatus 108 by providing user details and also by creating login details. Alternatively, the creative apparatus 108 can automatically create login details for the user in response to receipt of the user details. In some embodiments, the user is also prompted to install an application manager. The application manager enables the user to manage installation of various applications supported by the creative apparatus 108 and also to manage other functionalities, such as updates, subscription account and the like, associated with the applications. The user details are received by a user management engine 116 and stored as user data 118 in the data storage unit 112. In some embodiments, the user data 118 further includes account data 120 under which the user details are stored.

The user can either opt for a trial account or can make payment based on type of account or subscription chosen by the user. Alternatively, the payment can be based on product or number of products chosen by the user. Based on payment details of the user, a user operational profile 122 is generated by an entitlement engine 124. The user operational profile 122 is stored in the data storage unit 112 and indicates entitlement of the user to various products or services. The user operational profile 122 also indicates type of user, i.e. free, trial, student, discounted, or paid.

In some embodiment, the user management engine 116 and the entitlement engine 124 can be one single engine performing the functionalities of both the engines.

The user then installs various applications supported by the creative apparatus 108 via an application download management engine 126. Application installers or application programs 128 present in the data storage unit 112 are fetched by the application download management engine 126 and made available to the user directly or via the application manager. In one embodiment, all application programs 128 are fetched and provided to the user via an interface of the application manager. In another embodiment, application programs 128 for which the user is eligible based on user's operational profile are displayed to the user. The user then selects the application programs 128 or the applications that the user wants to download. The application programs 128 are then downloaded on the user device 102A by the application manager via the application download management engine 126. Corresponding data regarding the download is also updated in the user operational profile 122. An application program 128 is an example of the digital tool. The application download management engine 126 also manages process of providing updates to the user device 102A.

Upon download, installation and launching of an application program, in one embodiment, the user is asked to provide the login details. A check is again made by the user management engine 116 and the entitlement engine 124 to ensure that the user is entitled to use the application program. In another embodiment, direct access is provided to the application program as the user is already logged into the application manager.

The user uses one or more application programs 128 to create one or more projects or assets. In addition, the user also has a workspace within each application program. The workspace, as described herein, includes setting of the application program, setting of tools or setting of user interface provided by the application program, and any other setting or properties specific to the application program. Each user has a workspace. The workspace, the projects or the assets are then stored as application program data 130 in the data storage unit 112 by a synchronization engine 132. The synchronization engine 132 also includes a font engine 134 for synchronizing or storing fonts included as part of the application program data 130. The application program data 130 can be specific to the user or can be shared with other users based on rights management. The rights management is performed by a rights management engine 136. Rights management rules or criteria are stored as rights management data 138 in the data storage unit 112.

The application program data 130 includes one or more assets 140. The assets 140 can be a shared asset which the user wants to share with other users or which the user wants to offer on a marketplace. The assets 140 can also be shared across multiple application programs 128. Each asset includes metadata 142. Examples of the metadata 142 include, but are not limited to, font, color, size, shape, coordinate, a combination of any of these, and the like. In addition, in one embodiment, each asset also includes a file. Examples of the file include, but are not limited to, an image 144, text 146, a video 148, a font 150, a document 152, a combination of any of these, and the like. In another embodiment, an asset only includes the metadata 142.

The application program data 130 also include project data 154 and workspace data 156. In one embodiment, the project data 154 includes the assets 140. In another embodiment, the assets 140 are standalone assets. Similarly, the workspace data 156 can be part of the project data 154 in one embodiment while it may be standalone data in other embodiments.

The user can have one or more user devices. The application program data 130 is accessible by the user from any device, i.e. including the device which was not used to create the assets 140. This is achieved by the synchronization engine 132 that stores the application program data 130 in the data storage unit 112 and makes the application program data 130 available for access by the user or other users via any device. Before accessing the application program data 130 by the user from any other device or by any other user, the user or the other user may need to provide login details for authentication if not already logged in. Else, if the user or the other user are logged in then a newly created asset or updates to the application program data 130 are provided in real time. The rights management engine 136 is also called to determine whether the newly created asset or the updates can be provided to the other user or not. The workspace data 156 enables the synchronization engine 132 to provide same workspace configuration to the user on any other device or to the other user based on the rights management data 138.

In various embodiments, various types of synchronization can be achieved. For example, the user can pick a font or a color from the user device 102A using a first application program and can use the font or the color in a second application program on any other device. If the user shares the font or the color with other users, then the other users can also use the font or the color. All this synchronization happens in real time. Similarly, synchronization of any type of the application program data 130 can be performed.

In some embodiments, the user interaction with the application programs 128 is also tracked by an application analytics engine 158 and stored as application analytics data 160. The application analytics data 160 includes, for example, usage of a tool, usage of a feature, usage of a workflow, usage of the assets 140, and the like. The application analytics data 160 can include the usage data on a per user basis and can also include the usage data on a per tool basis or per feature basis or per workflow basis or any other basis. The application analytics engine 158 embeds a piece of code in the application programs 128 that enables an application program to collect the usage data and send it to the application analytics engine 158. The application analytics engine 158 stores the usage data as the application analytics data 160 and processes the application analytics data 160 to draw meaningful output. For example, the application analytics engine 158 can draw an output that the user uses "Tool 4" maximum number of times. The output of the application analytics engine 158 is used by a personalization engine 162 to personalize tool menu for the user to show "Tool 4" on top. Other types of personalization can also be performed based on the application analytics data 158. In addition, the personalization engine 162 can also use the workspace data 156 or the user data 118 including user preferences to personalize one or more application programs 128 for the user.

In some embodiments, the application analytics data 160 includes data indicating status of project of the user. For example, if the user was preparing an article in a digital publishing application and what was left was publishing the prepared article at the time the user quit the digital publishing application then the application analytics engine 158 tracks the state. Now when the user next opens the digital publishing application on another device then the user is indicated the state and options are provided to the user for publishing using the digital publishing application or any other application. In addition, while preparing the article recommendation can also be made by the synchronization engine 132 to incorporate some of other assets saved by the user and relevant for the article. Such recommendation can be generated using one or more engines as described herein.

The creative apparatus 108 also includes a community engine 164 which enables creation of various communities and collaboration among the communities. A community, as described herein, includes a group of users that share at least one common interest. The community can be closed, i.e. limited to a number of users or can be open, i.e. anyone can participate. The community enables the users to share each other's work and comment or like each other's work. The work includes the application program data 140. The community engine 164 stores any data corresponding to the community, such as work shared on the community and comments or likes received for the work as community data 166. The community data 166 also includes notification data and is used for notifying other users by the community engine in case of any activity related to the work or new work being shared. The community engine 164 works in conjunction with the synchronization engine 132 to provide collaborative workflows to the user. For example, the user can create an image and can request for some expert opinion or expert editing. An expert user can then either edit the image as per the user liking or can provide expert opinion. The editing and providing of the expert opinion by the expert is enabled using the community engine 164 and the synchronization engine 132. In collaborative workflows, a plurality of users is assigned different tasks related to the work.

The creative apparatus 108 also includes a marketplace engine 168 for providing marketplace to one or more users. The marketplace engine 168 enables the user to offer an asset for selling or using. The marketplace engine 168 has access to the assets 140 that the user wants to offer on the marketplace. The creative apparatus 108 also includes a search engine 170 to enable searching of the assets 140 in the marketplace. The search engine 170 is also a part of one or more application programs 128 to enable the user to perform search for the assets 140 or any other type of the application program data 130. The search engine 170 can perform a search for an asset using the metadata 142 or the file.

The creative apparatus 108 also includes a document engine 172 for providing various document related workflows, including electronic or digital signature workflows, to the user. The document engine 172 can store documents as the assets 140 in the data storage unit 112 or can maintain a separate document repository (not shown in FIG. 1).

It is to be appreciated that the engines and working of the engines are described as examples herein and the engines can be used for performing any step in providing digital experience to the user.

Marketing Apparatus

The marketing apparatus 110 includes one or more engines for providing one or more digital experiences to the user. The marketing apparatus 110 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. The marketing apparatus 110 also includes a data storage unit 114. The data storage unit 114 can be implemented as one or more databases or one or more data servers. The data storage unit 114 includes data that is used by the engines of the marketing apparatus 110.

In one embodiment, the marketing apparatus 110 can be divided into two layers of engines, i.e. Layer 1 including core engines that provide workflows to the user and Layer 2 including shared engines that are shared among the core engines. Any core engine can call any of the shared engine for execution of corresponding task. In another embodiment, the marketing apparatus does not have layers and each core engine can have an instance of the shared engines. In either embodiment, each core engine can access the data storage unit 114 directly or through the shared engines.

The user of the user device 102A visits a webpage or an application store to explore applications supported by the marketing apparatus 110. The marketing apparatus 110 provides the applications as a software as a service (SaaS), or as a standalone application that can be installed on the user device 102A, or as a combination. The user creates an account with the marketing apparatus 110 by providing user details and also by creating login details. Alternatively, the marketing apparatus 110 can automatically create login details for the user in response to receipt of the user details. The user can also contact the entity offering the services of the marketing apparatus 110 and can get the account created through the entity. The user details are received by a subscription engine 174 and stored as user data 176 in the data storage unit 114. In some embodiments, the user data 114 further includes account data 178 under which the user details are stored.

The user can opt for subscription of one or more engines of the marketing apparatus 110. Based on subscription details of the user, a user subscription profile 180 is generated by the subscription engine 174 and stored. The user subscription profile 180 is stored in the data storage unit 114 and indicates entitlement of the user to various products or services. The user subscription profile 180 also indicates type of subscription, i.e. premium subscription or regular subscription.

The marketing apparatus 110 includes a content publishing and management engine 182 that enables the user to create web sites and other content. The content publishing and management engine 182 provides an end to end workflow to the user right from creation of content, to hosting of content, to publishing of content, and finally, to management, i.e. editing and republishing, of content. The content publishing and management 182 further includes one or more engines (not shown in FIG. 1), such as asset management engine, website management engine, mobile content management engine, form management engine, search engine and community management engine to enable one or more workflows. The user can create content, such as forms, mobile application or webpage content, using the content publishing and management 182. The user can either do the creation or can send it for creation to third party via workflows provided through the content publishing and management engine 182. The user then publishes the content and manages it through the content publishing and management engine 182. The user can also create communities or forums for discussions with customers and manage the communities through the content publishing and management engine 182. The content publishing and management engine 182 also provides asset management capabilities including asset searching using various tags and metadata. The content publishing and management engine 182 stores assets 184 in the data storage unit 114. Examples of the assets 182 include, but are not limited to, image, text, document, video, audio, font, and metadata. In addition, the content publishing and management engine 182 enables multisite, i.e. multiple websites and mobile content, management workflows, and commerce, i.e. personalized shopping experiences that incorporate video, social, and other dynamic media, related workflows. For some of the functionalities, such as asset management, the content publishing and management engine 182 can work in conjunction with the creative apparatus 108 and access data from the data storage unit 112.

Each engine of the marketing apparatus 110 also stores customer data 186 for the user in the data storage unit 114. The user or the entity of the user can have one or more customers, including potential customers, and hence, the one or more engines of the marketing apparatus 110 store the customer data 186. The customer data 186 can be shared across these engines or can be specific to each engine. In some embodiments, the access data 184 is a part of the customer data 186. The access to the customer data 186 is controlled by an access control engine 188 which can be shared across the engines of the marketing apparatus 110 or each engine can have one instance of the access control engine 188. The access control engine 188 determines if the user has access to a particular customer data 186 based on the subscription of the user and access rights of the user.

The marketing apparatus 110 also includes an analytics engine 190. The user can enable tracking of the content while creating the content or at any other point. Various methods of tracking can be used. For example, tracking code can be embedded into the content for tracking and sending tracked data to the analytics engine 190. The analytics engine 190 tracks the data and stores tracked data as analytics data 192. The analytics engine 190 tracks the data and performs meaningful processing of the analytics data 192 to provide various reports to the user. In addition, in one embodiment, the analytics engine 190 also acts as a shared engine and is accessible by other engines to obtain meaningful analysis on basis of which other engines can offer various functionalities to the user. In another embodiment, each engine can have an instance of the analytics engine 190 which is customized according to need of that engine. The analytics engine 190 is used for tracking all types of content, such as mobile application, video, image, web site, document, advertisement, and also for tracking the assets 184. The analytics engine 190 also supports predictive intelligence to provide predictions based on the analytics data 192. The analytics engine 190 also stitches information tracked from various sources where the content is consumed and provides a holistic view, i.e. 360 degrees' view of the analytics data 192.

The marketing apparatus 110 also includes a social marketing engine 194 for providing social marketing related workflows. The social marketing engine 194 allows the user to share the content on social networks, and then manage the content sharing and associated information, such as posts and comments. For example, the social marketing engine 194 provides recommendations to the user to determine when to post which content and to determine how audience will react to the post, helps the user to respond to queries from viewers of post, and performs other managing related to the post. In addition to the social networks, the social marketing engine 194 also provides workflows to manage content on blog, and other communities. The social marketing engine 194 provides recommendations by tracking the data on social networks and storing the data as social marketing data 195. The social marketing data 195 is then processed by the social marketing engine 194 to determine recommendations. The social marketing engine 194 can automate many manual workflows. For example, the social marketing engine 194 can perform automatic posting of the post at an appropriate time, automatically respond to queries from post viewers and the like. The social marketing engine 194 uses the analytics engine 190 for tracking data on social networks or can source data from the social networks. The social marketing engine 194 can also be a shared engine which can be accessed by various engines of the marketing apparatus 110. Alternatively, the engines can have an instance of the social marketing engine 194 and can directly access the social marketing data 195.

The marketing apparatus 110 also includes a content personalization engine 196. The content personalization engine 196 enables the user to provide different digital experiences to the customers when different customers visit same webpage or same application of the user. The content personalization engine 196 provides various workflows to the user to create different versions of the webpage or the application or the content and to perform AB testing. Based on the testing, the user may choose to provide different personalization for different sets of customers. The content personalization engine 196 also uses the customer data 186 which can be part of the analytics data 192, in one embodiment, or can be stored separately in another embodiment. The customer data 186 includes customer profiles. The customers, as described herein, also includes mere visitors which are not customers yet. A profile includes one or more attributes of a customer. An attribute, as described herein, is a concept using which the customer can be segmented. Examples of the attribute include, but are not limited to, geographical location, age, gender, purchase capacity, language, habits, browsing trends, or any other attribute using which the customers can be segmented. The customer data 186 is generated by a customer segmentation engine 197 by collecting data from different sources including electronic sources, such as the analytics engine 190, online forms, customer submitting data online, and other online sources, and non-electronic sources including paper forms and other offline sources. The customer data 186 can be shared between users and some of the customer data 186 can be specific to each user and not accessible by other users. The customer segments are used by the content personalization engine 196 to personalize content and show relevant content to the customers. In addition, the content personalization engine provides automated workflows to enable the personalization including providing recommendations for the content that should be shown to a particular customer segment.

The marketing apparatus 110 also includes a campaigning and messaging engine 198 that enables workflows for the user to perform marketing campaigns including sending marketing emails. The campaigning and messaging engine 198 uses the customer data 186 and generates customer segments for performing marketing campaigns. Alternatively, the campaigning and messaging engine 198 uses customer segmentation engine 197 for generating customer segments. A marketing campaign, as defined herein, includes sending marketing messages to customers. The messages can be sent as electronic mails, mobile messages, push to text, social networks, advertisements, or as any other type of message. The campaigning and messaging engine 198 customizes the messages before the messages are send out. For customization, the campaigning and messaging engine 198 provides automated workflows to the user. The user can specify attributes for customer segmentation and the campaigning and messaging engine 198 automatically picks the customers to whom the message is to be sent and also personalizes the message based on the attributes of the customer segment. The campaigning and messaging engine 198 also provides AB testing option to the user to test which message to send out of two messages. The campaigning and messaging engine 198 also stores different customer segments for each user in the customer data 186. In addition, the content used for creating personalized messages, email identifiers and other data is stored as part of the customer data 186 which can be specific for the user and inaccessible to other users.

The marketing apparatus 110 also includes marketing and advertisement spend optimization engine 199. The marketing and advertisement spend optimization engine 199 helps the user in budget management for running marketing campaigns, showing advertisements on websites, as search results, social advertisements, and other form of advertising. The marketing and advertisement spend optimization engine 199 tracks budget spend of the user and the budget remaining, and based on that performs analysis to recommend advertising channels for maximizing benefit. In addition, the marketing and advertisement spend optimization engine 199 uses the customer data 186 and the analytics data 192, and stitches that data to generate the recommendation. The analytics data 192 includes information on how the marketing content performed. The customer data 186 further indicates what type of customers visited the marketing content and the analytics data 192 further indicates who all among those customers ended up in performing a transaction.

In various embodiments, the customer data 186 also includes data regarding devices used by the customers. The device data is used for stitching customer data. For example, a customer 1 may use device 1 to visit website A. The customer 1 may user device 2 to visit website B. The website A and the website B may belong to the same user. So, instead of considering customer 1 as two different customers the data including at least one common identifier such as email id helps the user to identify that the two different visits were made by the same customer 1. Also, by doing analysis on the customer data 186 and the analytics data 192, richer customer profiles or segments can be generated. Also, devices that correspond to the same customer can be identified resulting in providing more targeted digital experience to the customer and making benefit for the user.

The marketing apparatus 110 also includes a video streaming and advertising engine 191 that helps the user, such as broadcasters, cable networks and service providers create and monetize engaging and personalized viewing experiences. The video streaming and advertising engine 191 can be implemented to provide a software development kit to the user to build and deliver videos to the customers. In addition, the video streaming and advertising engine 191 provides workflows to the user to insert advertisement within the videos and provides recommendations to the user for locations for advertisement insertion. The recommendations are generated using the analytics data 192 which includes information regarding what portions of video was viewed most and other video analytics data, and also using the customer data 186 which includes customer segments who viewed the video and corresponding advertisement. The video streaming and advertising engine 191 also stores rights management data 193 for different videos for the customers of the user. For example, if a video is paid then the video streaming and advertising engine 191 does not provide access to the customer based on the rights management data 193. Using the rights management data 193, the video streaming and advertising engine 191 protects content rights across various devices of the customers. Also, the video streaming and advertising engine 191 includes an authentication engine for authenticating the customers. The customer authentication data can also be stored as part of the customer data 186. The customer authentication data includes login details or other identifiers for the customer.

Although the creative apparatus 108 and the marketing apparatus 110 are described and shown separately, there are many workflows in which engines of the creative apparatus 108 and the engines of the marketing apparatus 110 work together. For example, when the content is created using the creative apparatus 108 then code corresponding to the engines of the marketing apparatus 110 is included in the content to track content using the engines of the marketing apparatus 110. Also, the data tracked by the engines of the marketing apparatus 110 can then be consumed by the engines of the creative apparatus 108 to provide enhanced offerings to the user. Similarly, content created by the engines of the creative apparatus 108 can be consumed by the engines of the marketing apparatus 110 while creating the content using the marketing apparatus 110. It is to be appreciated that the two apparatuses can be implemented on same or different servers or platforms or cloud infrastructures. Also, there can be scenarios when engines of the marketing apparatus 110 and the creative apparatus 108 can be combined into one. For example, the application analytics engine 158 and the analytics engine 190 can be implemented using one single analytics engine. Similarly, there can be scenarios when data of the user who is using both the creative apparatus 108 and the marketing apparatus 110 can be stored in a single data storage unit or in a data storage unit shared by both the apparatuses.

It is to be appreciated that the engines and working of the engines are described as examples herein and the engines can be used for performing any step in providing a digital experience to the user.

Embodiments of the invention provide techniques, systems, and computer-readable mediums with stored instructions that enable providing a looping video. The functions involved in these embodiments of the invention generally involve producing a loping video. These functions are generally implemented on one or more computing devices that use one or more processors to execute algorithms of one or more operations defined in stored instructions. The computing devices that perform these functions can be located on a user's local computing device, such as on the user device 102A, or on a remote computing device, such as on creative apparatus 108 of FIG. 1. The operations of various exemplary algorithms that can be employed to perform these functions are discussed throughout this specification.

Exemplary Techniques for Providing Looping Video

Figure 2:
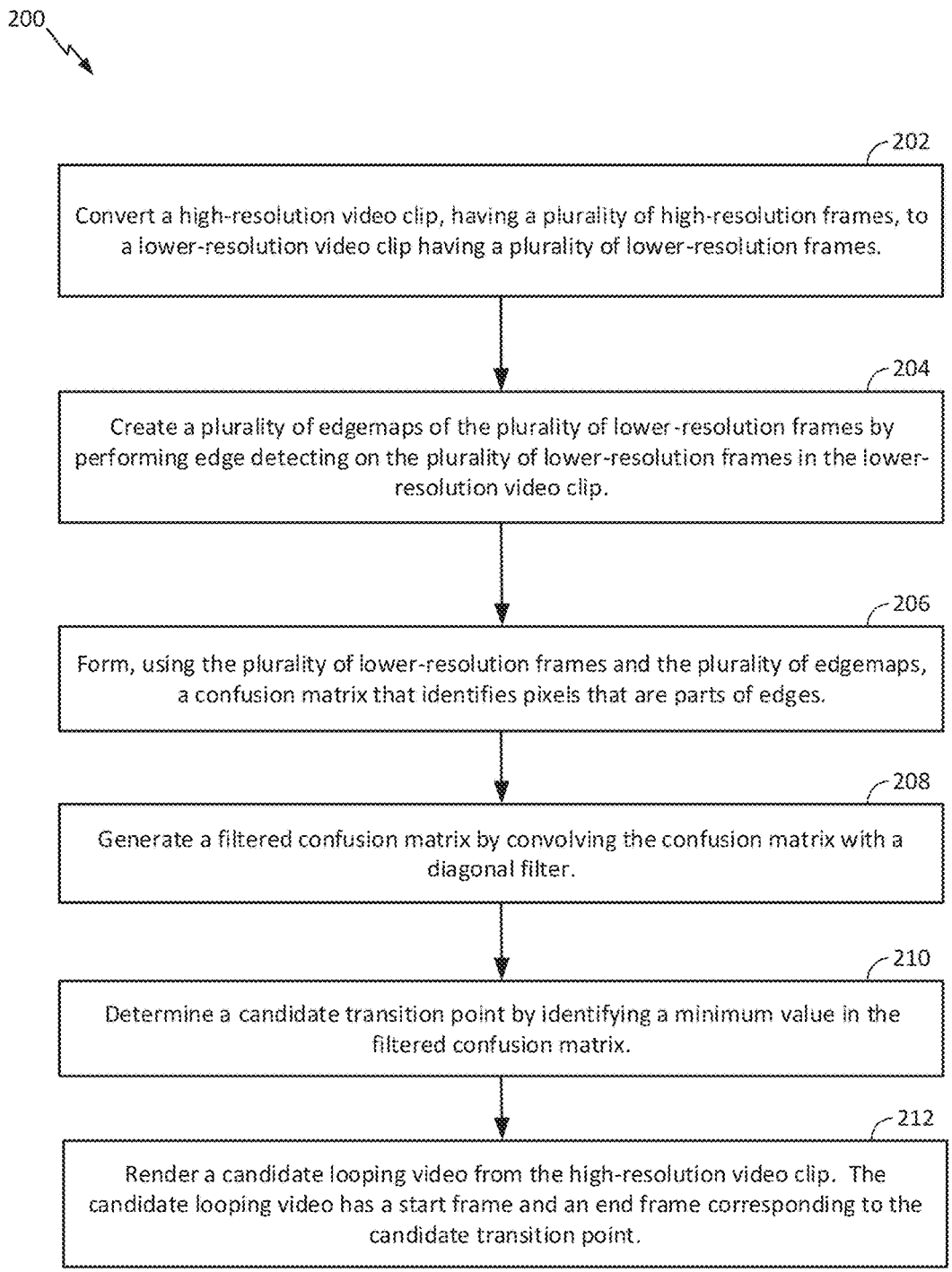
FIG. 2 is a flow chart illustrating an exemplary technique for providing looping video.
Figure 3:
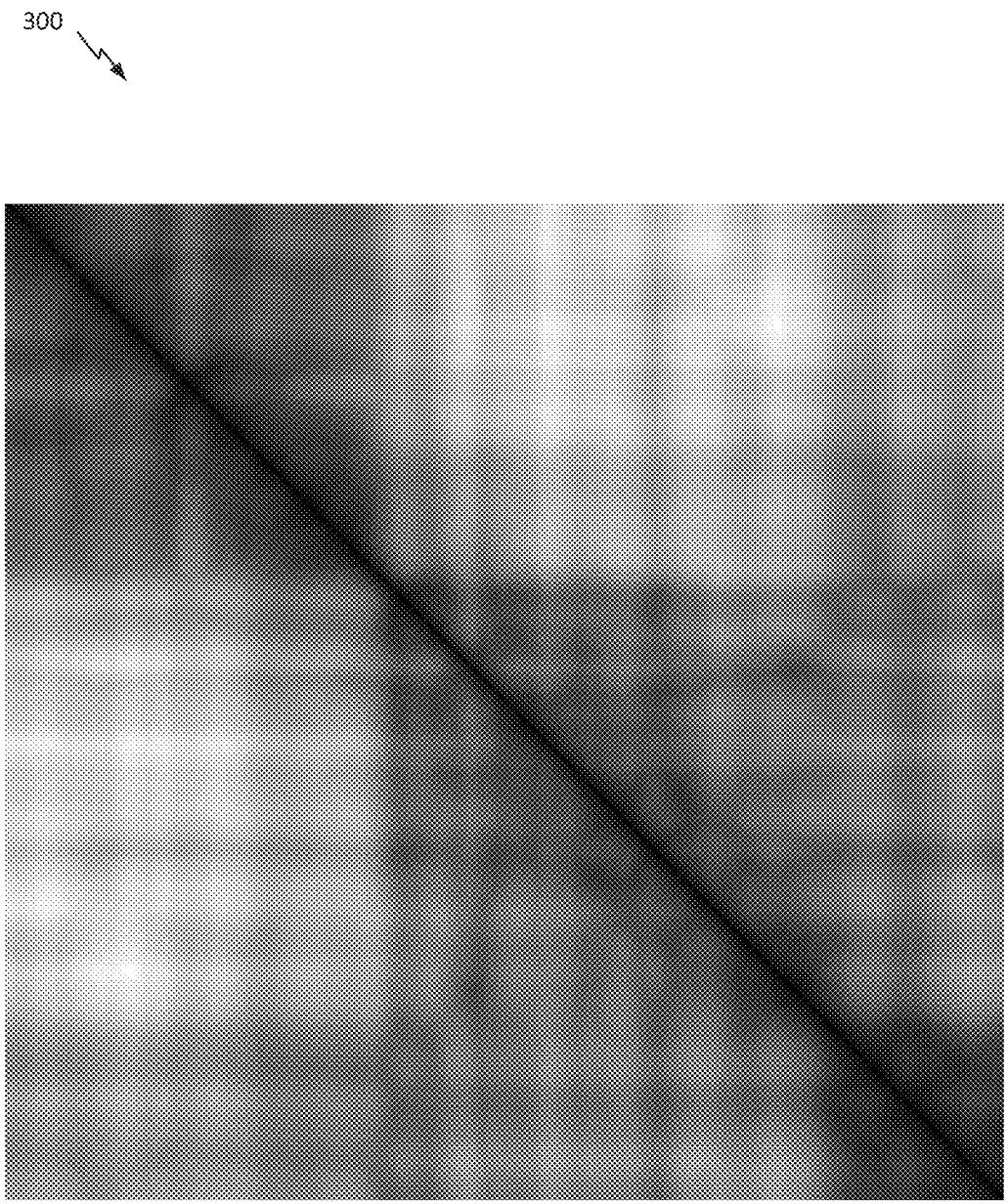
FIG. 3 depicts an example confusion matrix.
Figure 4:
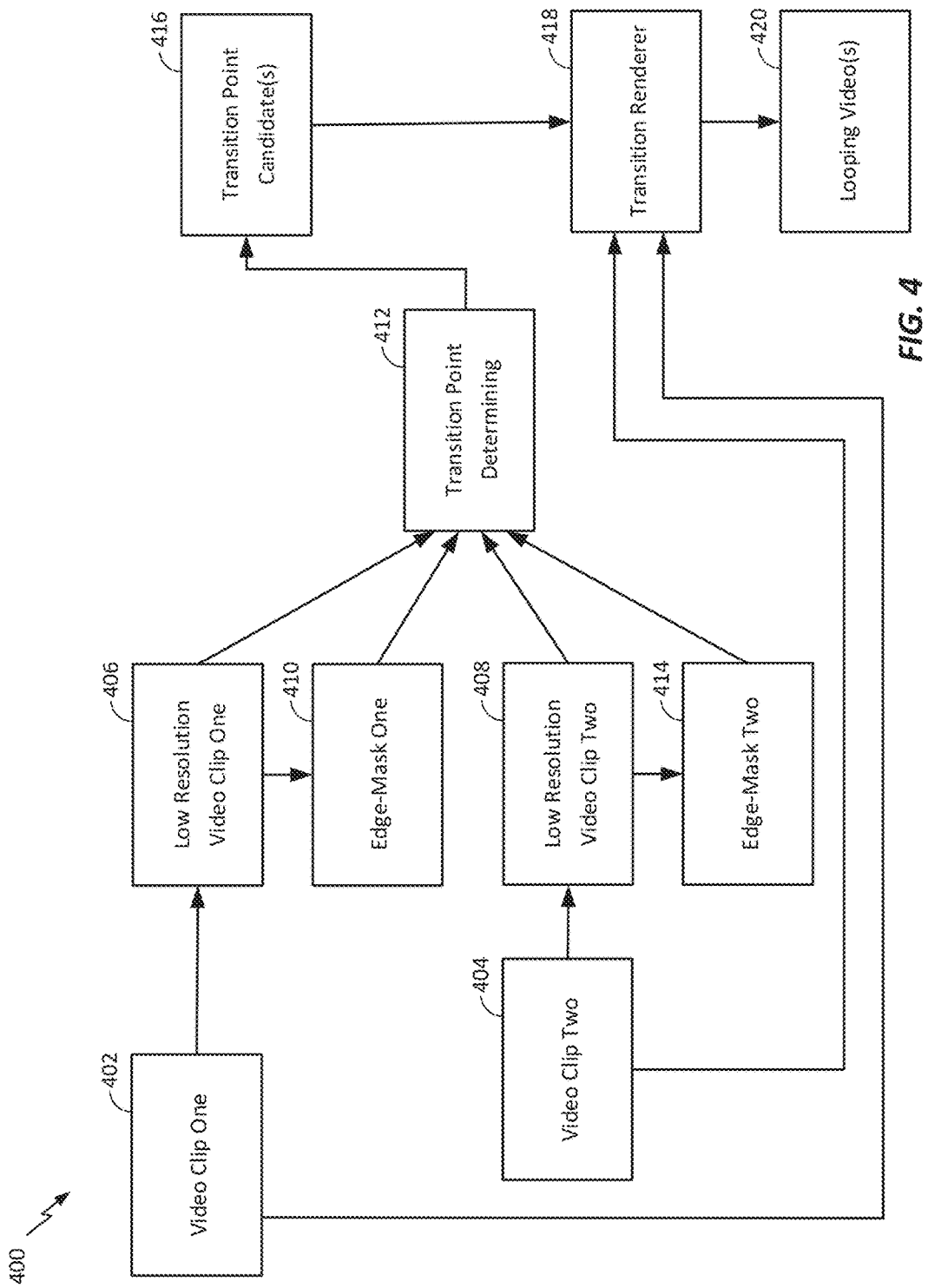
FIG. 4 is a flow chart illustrating an exemplary technique for providing looping video.

FIG. 2 is a flow chart illustrating an exemplary technique 200 for providing looping video. FIG. 2 is described with reference to FIGS. 3-4, which provide further embodiments, and details about implementing the exemplary technique 200. FIG. 3 depicts an example confusion matrix 300. FIG. 4 is a flow chart illustrating an exemplary technique 400 for providing looping video using the techniques described hereby.

The exemplary technique 200 implements a lower-resolution version of a fixed-length high-resolution video clip, and detects a presence of edges within image frames in the lower-resolution version to form edgemaps. The exemplary technique 200 prepares a confusion matrix by adding pixel differences between full-color frames, for any area that is a part of either of the edgemaps formed from the frames. For example, similarity of the frames is compared only where there exists an edge in one frame or the other. In other words, the confusion matrix identifies a total difference between un-masked pixels in corresponding frames. The confusion matrix is then filtered. At least one pair of image frames having similar edges are determined, by identifying a minimum value in the filtered confusion matrix, as a pair of candidates for a transition point (i.e., a start frame and an end frame) at which an output looping video can repeat. A candidate looping video is rendered from the high-resolution video clip, with the candidate looping video having a start frame and an end frame corresponding to the transition point.

In an example, a plurality of high-resolution video clips is compared to identify at least one transition point between the plurality of high-resolution video clips. Thus, in examples, the provided techniques can determine at least one candidate transition point between at least two videos. In another example, one high-resolution video clip is compared to itself to identify at least one transition point within the one high-resolution video clip.

The exemplary technique 200 can be implemented by user device 102A and/or creative apparatus 108, although other devices and configurations can also be implemented. The exemplary technique 200 can be implemented by storing and executing instructions in a non-transitory computer-readable medium. Reference to the technique 200 being performed by a computing device includes the technique 200 being performed by one or more computing devices.

In block 202, a high-resolution video clip, having a plurality of higher-resolution frames, is converted to a lower-resolution video clip having a plurality of lower-resolution frames. The lower-resolution clip can be created by making each new pixel in the lower-resolution video clip have a pixel value (e.g., a color) that is an average of pixel values from an area, in the higher-resolution video clip, that the new pixel represents. For example, downsizing the higher-resolution video clip by a factor of four produces new pixels in the lower-resolution video clip, where each new pixel has a value that is an average of sixteen pixels from the higher-resolution video clip. The lower-resolution video clip can be full-frame or less-than full-frame. The conversion reduces a dataset upon which further processing is implemented. The conversion can thus produce looping video in a faster manner, using fewer processor cycles and less energy than conventional techniques.

Referring to FIG. 4, video clip one 402 and optional video clip two 404 are examples of high-resolution video clips, which are converted into low-resolution video clip one 406 and optional low-resolution video clip two 408.

In block 204, a plurality of edgemaps of the plurality of lower-resolution frames is created by performing edge detecting on the plurality of lower-resolution frames in the lower-resolution video clip. The edges show which parts of the plurality of lower-resolution frames are important and should subsequently be compared with each other. In other words, the edges can act as a proxy for saliency maps. Performing edge detecting also helps to identify salient image features, such as edges of an object which should not be teleported, while discarding unnecessary image features. The edge detecting thus quickly approximates saliency in order to enable quickly determining if two compared images can form a candidate transition point. In embodiments, a Canny edge detector can be implemented while performing the edge detecting. Performing edge detecting advantageously reduces the dataset to be processed, which speeds implementing the exemplary technique 200.

A simplified example of the lower-resolution video clip and the plurality of edgemaps is depicted in FIGS. 5A-5J, and described in further detail below with respect to these figures. The images in FIGS. 5A-5J are illustrative and not limiting, Referring to FIG. 4, edge mask one 410 is applied to low-resolution video clip one 406 to produce a first edgemap which is sent to the transition point determining block 412. Edge mask two 414 can be applied to optional low-resolution video clip two 408 to produce a second edgemap which is sent to the transition point determining block 412. The transition point determining block 412 can perform at least a portion of the steps described in blocks 206-210.

In block 206, a confusion matrix that identifies pixels that are parts of edges is formed using the lower-resolution video clip and the plurality of edgemaps. A confusion matrix can help identify strength of a candidate transition point. The confusion matrix can be prepared by adding pixel differences between full-color frames, for any area that is a part of either of the edgemaps formed from the frames. For example, similarity of the frames is compared only where there exists an edge in one frame or the other. In other words, the confusion matrix identifies a total difference between un-masked pixels in corresponding frames. We turn now to FIG. 3.

FIG. 3 depicts the example confusion matrix 300. The confusion matrix 300 identifies differences in pixel brightness (e.g., Pixel(i,j)) between two frames—a first frame "i", and a second frame "j". In embodiments, darker areas in the confusion matrix 300 indicate increased similarity between pixels in the first frame and the second frame, while lighter areas indicate reduced similarity between the pixels. In other example implementations, lighter areas in the confusion matrix 300 indicate increased similarity between pixels in the first frame and the second frame, while darker areas indicate reduced similarity between the pixels. We now return to FIG. 2.

In block 208, a filtered confusion matrix is generated by convolving the confusion matrix with a diagonal filter. Using filtered a confusion matrix avoids simply comparing appearances of single frames, and instead compares local, short video clips. For example, convolving with a 5×5 diagonal kernel requires that five consecutive frames be similar. As a further example, if the video clip includes video of a swinging pendulum, and only single frames are compared, then the resultant looping video you may show the pendulum instantly switching directions mid-swing, instead of going about a full swing. This could happen because the pendulum could be in the same instantaneous configuration on its downward and upward paths. Comparing multiple frames can avoid this.

In block 210, a candidate transition point is determined by identifying a minimum value in the filtered confusion matrix. This determining technique can provide looping video which is more accurate, which appears natural, and which is composed in a manner which has minimal (or no) teleporting when compared to conventional techniques.

In an embodiment, the determining the candidate transition point is constrained to compare fewer than all of the frames in the lower-resolution video clip. Comparing fewer than all frames can occur, for example, when the resultant looping video is to have a maximum duration (e.g., be no more than ten seconds long), is to be produced from a certain portion of the higher-resolution video, or both. Comparing fewer than all of the frames can advantageously save processor cycles and time. In another embodiment, the determining the candidate transition point is such that a candidate looping video is constrained to at least one of a minimum duration or a maximum duration. A video having too short of a duration may appear to merely show a vibrating object, while a clip that is too long may not retain user attention for the entire length of the looping video. Further, videos which are too long may require using too much data storage. A user input can be received which sets the minimum duration or a maximum duration.

Referring to FIG. 4, the transition point determining block 412 produces the transition point candidate(s) 416.

In block 212, a candidate looping video is rendered from the high-resolution video clip. The candidate looping video has a start frame and an end frame corresponding to the candidate transition point.

Referring to FIG. 4, the transition renderer 418 renders looping video(s) 420 from the video clip one 402, the optional video clip two 404, and the transition point candidate(s) 416.

In an embodiment, multiple looping videos can be rendered and displayed to provide a group of candidate looping videos. The group may include a number (e.g., three, ten, a number between 1 to 50, etc.) of candidate looping videos having the best transition points. The group of candidate looping videos can be displayed on a display to enable a user to choose one or more preferred videos from the group of candidate looping videos.

In an example, the determining the candidate transition point is constrained such that the candidate looping video has the start frame at, or after, a specific start time in the high-resolution video clip. In another example, the determining the candidate transition point is constrained such that the candidate looping video has the end frame at, or before, a specific end time in the high-resolution video clip. A user input can be received which sets the specific start time, the specific end time, or both.

In an aspect, the exemplary technique 200 includes performing an optical-flow alignment on the candidate looping video to align the start frame(s) with the end frame(s). In an embodiment, an optical-flow alignment locally manipulates at least one start frame with at least one end frame so that the start frame(s) and the end frame(s) align with each other as closely as possible. For example, a transition having one-half a second of frames (e.g., 15 frames, thirty frames, etc.) is rendered. During the transition, leaves of a flower are not 100% aligned with each other between the start frame and the end frame. Performing an optical-flow alignment on the video moves the leaves to overlap exactly with each other so that the transition appears smooth and natural-appearing.

Figure 6:
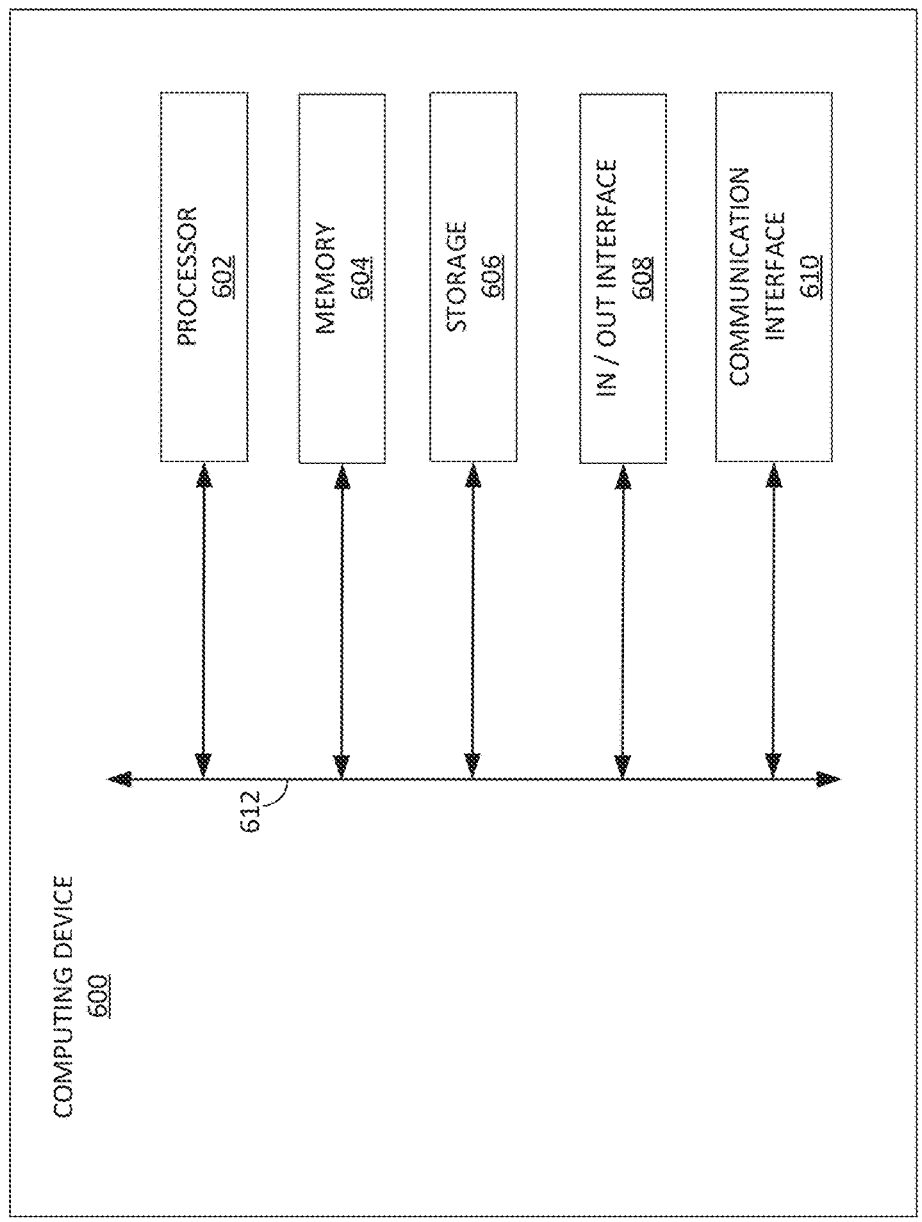
FIG. 6 is a block diagram depicting an example hardware implementation.

In an embodiment, the exemplary technique 200 includes displaying the candidate looping video on a display, such as via the in/out interface 608 in FIG. 6. In an embodiment, the exemplary technique 200 includes storing the candidate looping video in a memory device, such as the memory 604 in FIG. 6. In an embodiment, the exemplary technique 200 include transmitting the candidate looping video via an in/out interface device, such as the in/out interface 608 in FIG. 6.

FIGS. 5A-5J depict a simplified example using example images 500. The example images 500 include a series of images 502A-502J from a fixed-length video clip. The example images 500 also include a series of edge mask image results 504A-504J. The series of edge mask image results 504A-504J is produced by applying, to the series of images 502A-502J, an edge mask configured to identify straight edges. Other types of edge masks can be applied. The example images 500 are not limiting.

Figure 5A:
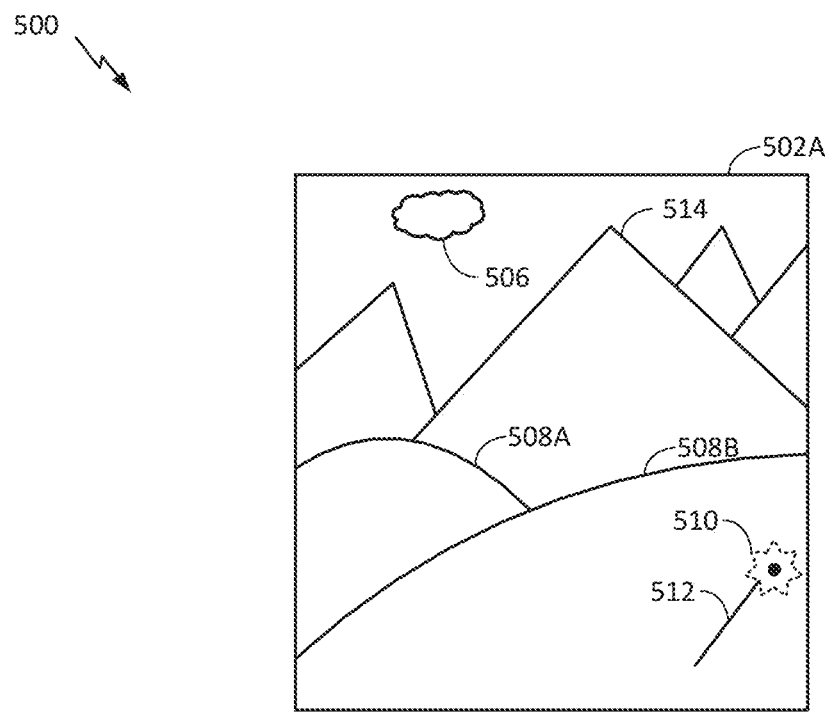
FIG. 5A depicts an image to provide an example using a series of images from a fixed-length video clip.
Figure 5A:
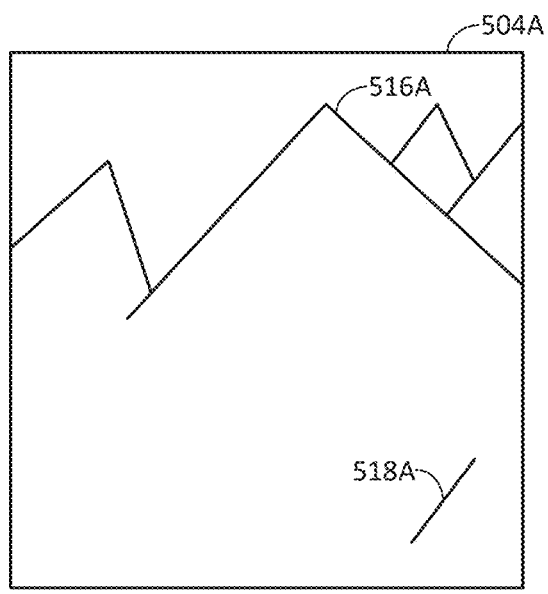
Figure 5B:
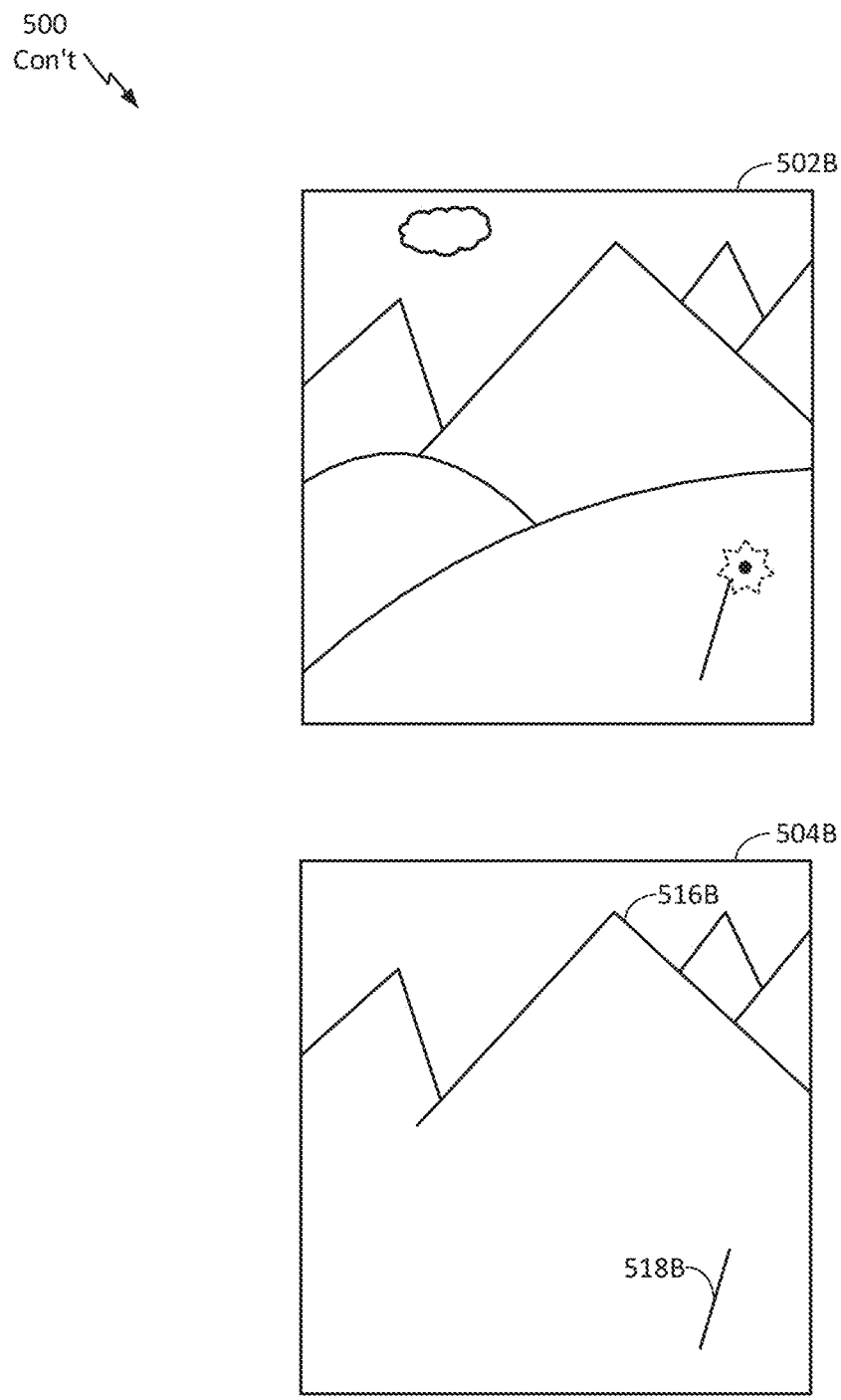
FIG. 5B depicts an image to provide an example using a series of images from the fixed-length video clip.
Figure 5C:
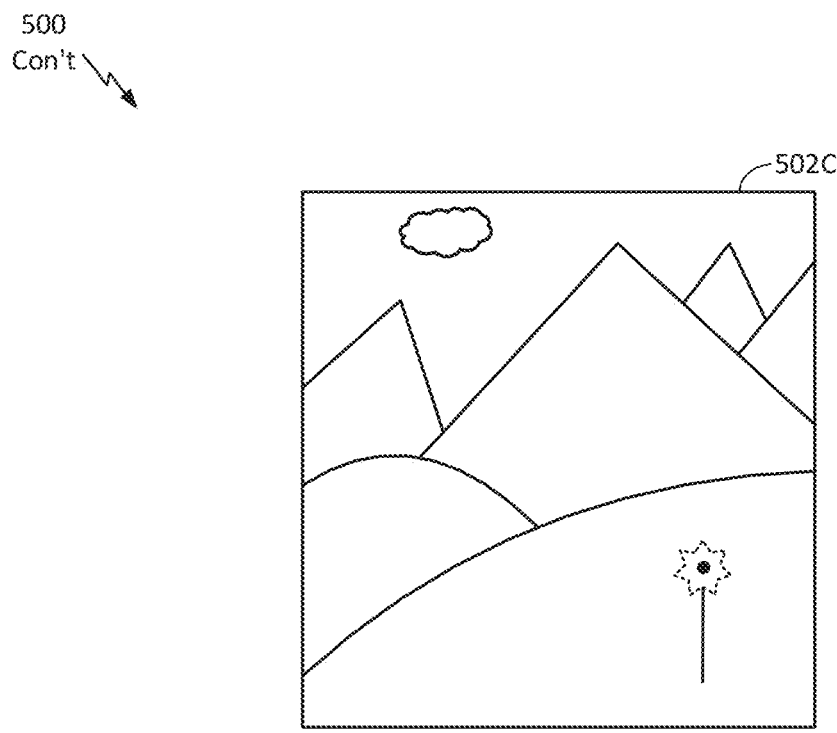
FIG. 5C depicts an image to provide an example using a series of images from the fixed-length video clip.
Figure 5C:
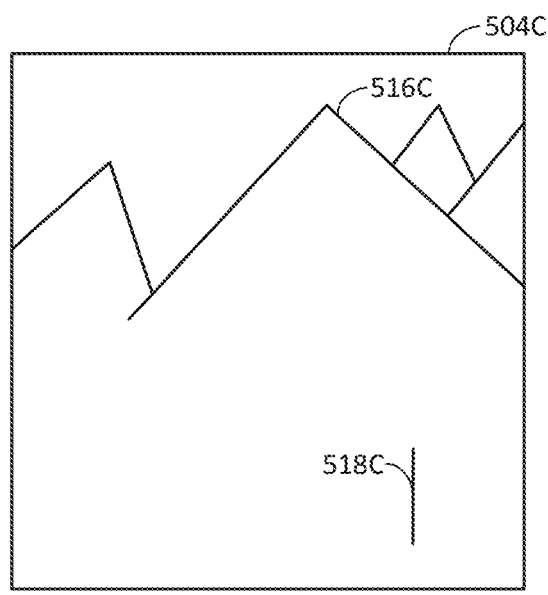
Figure 5D:
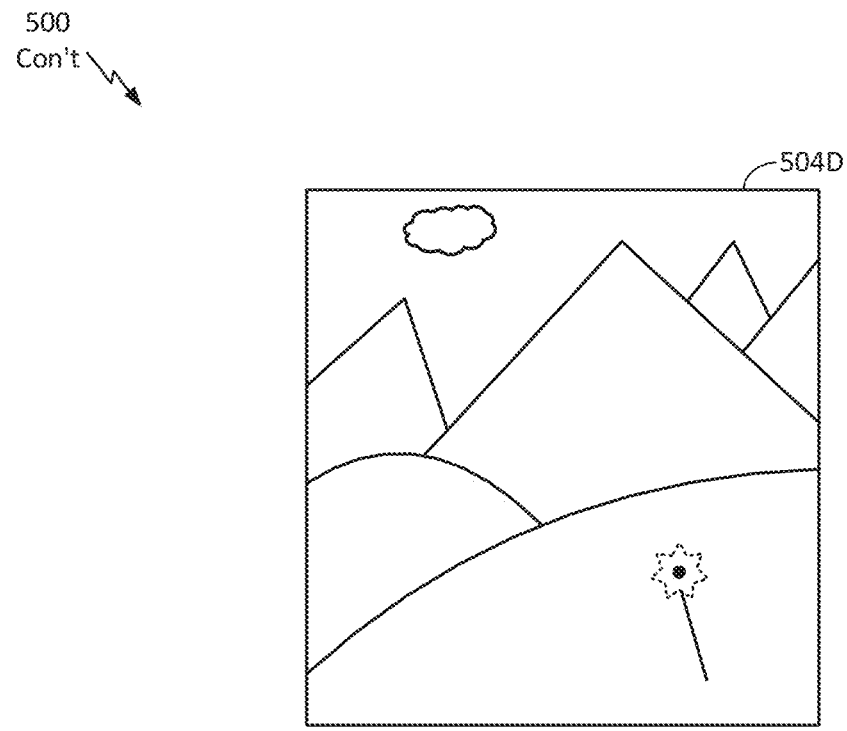
FIG. 5D depicts an image to provide an example using a series of images from the fixed-length video clip.
Figure 5D:
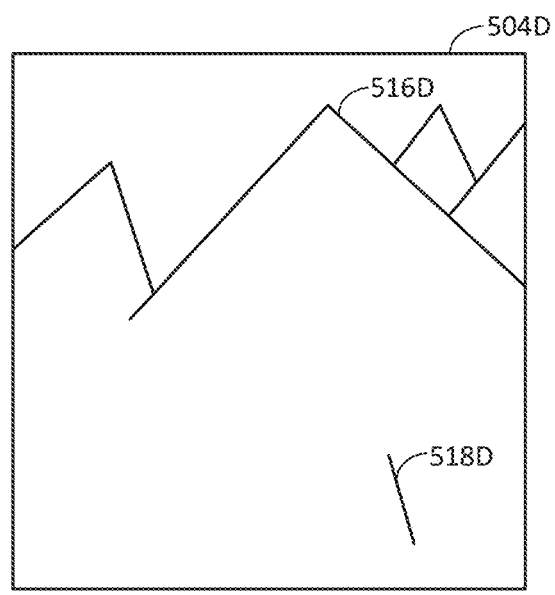
Figure 5E:
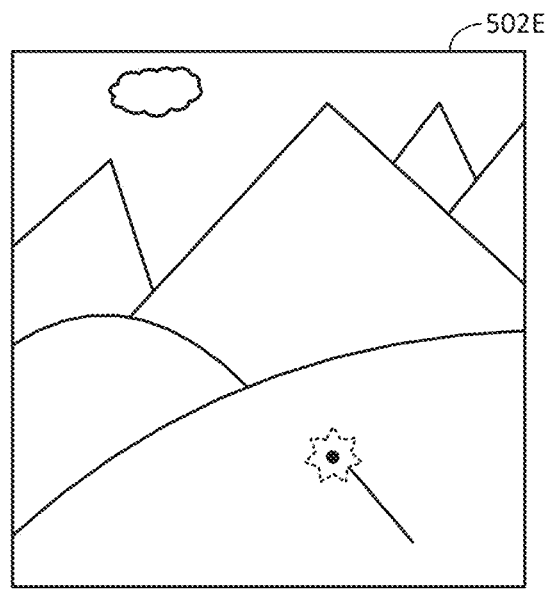
FIG. 5E depicts an image to provide an example using a series of images from the fixed-length video clip.
Figure 5E:
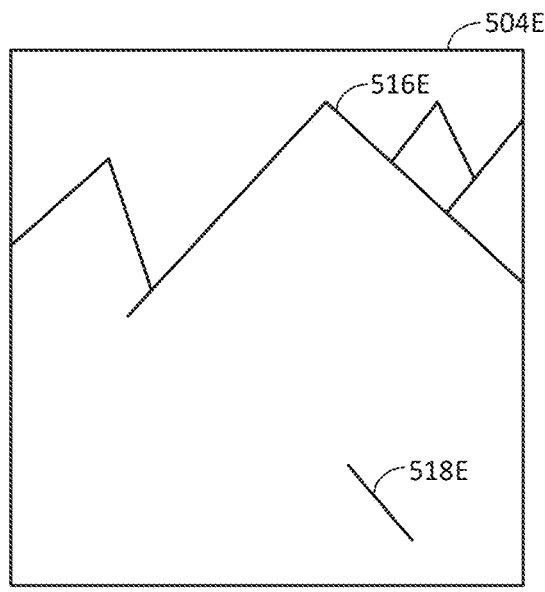
Figure 5F:
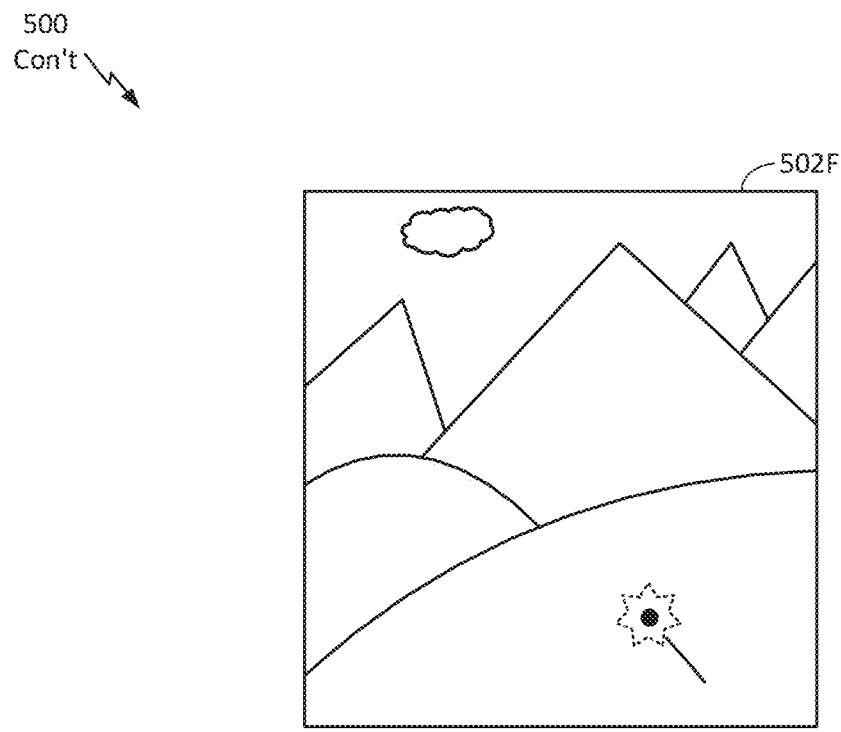
FIG. 5F depicts an image to provide an example using a series of images from the fixed-length video clip.
Figure 5F:
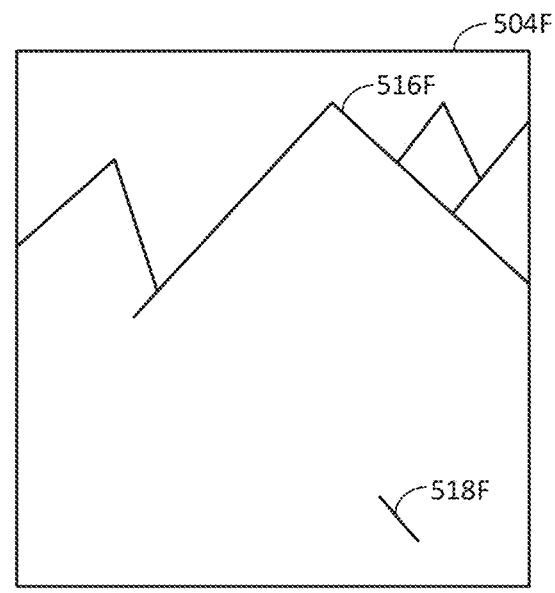
Figure 5G:
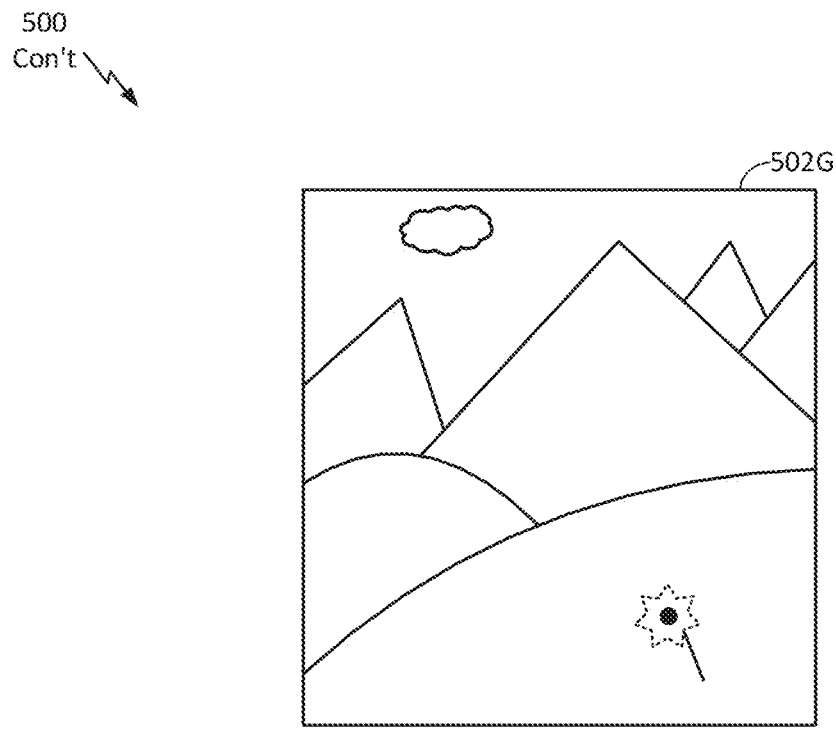
FIG. 5G depicts an image to provide an example using a series of images from the fixed-length video clip.
Figure 5G:
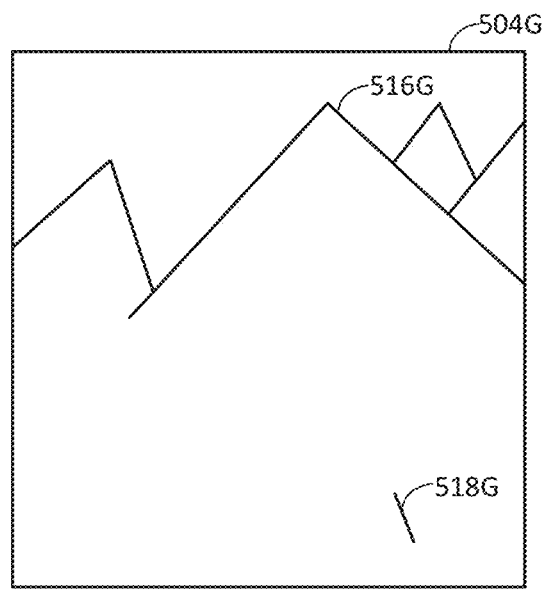
Figure 5H:
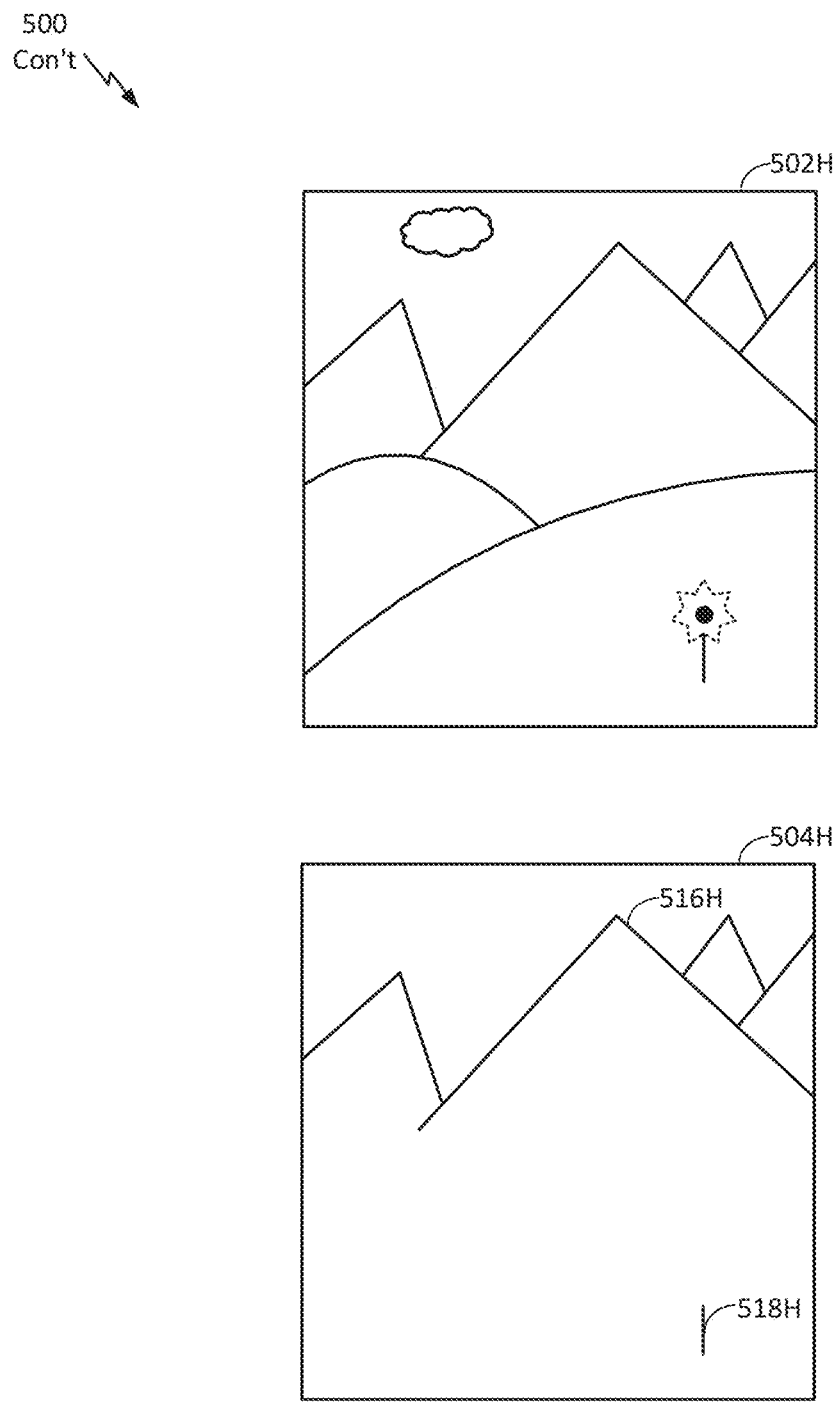
FIG. 5H depicts an image to provide an example using a series of images from the fixed-length video clip.
Figure 5I:
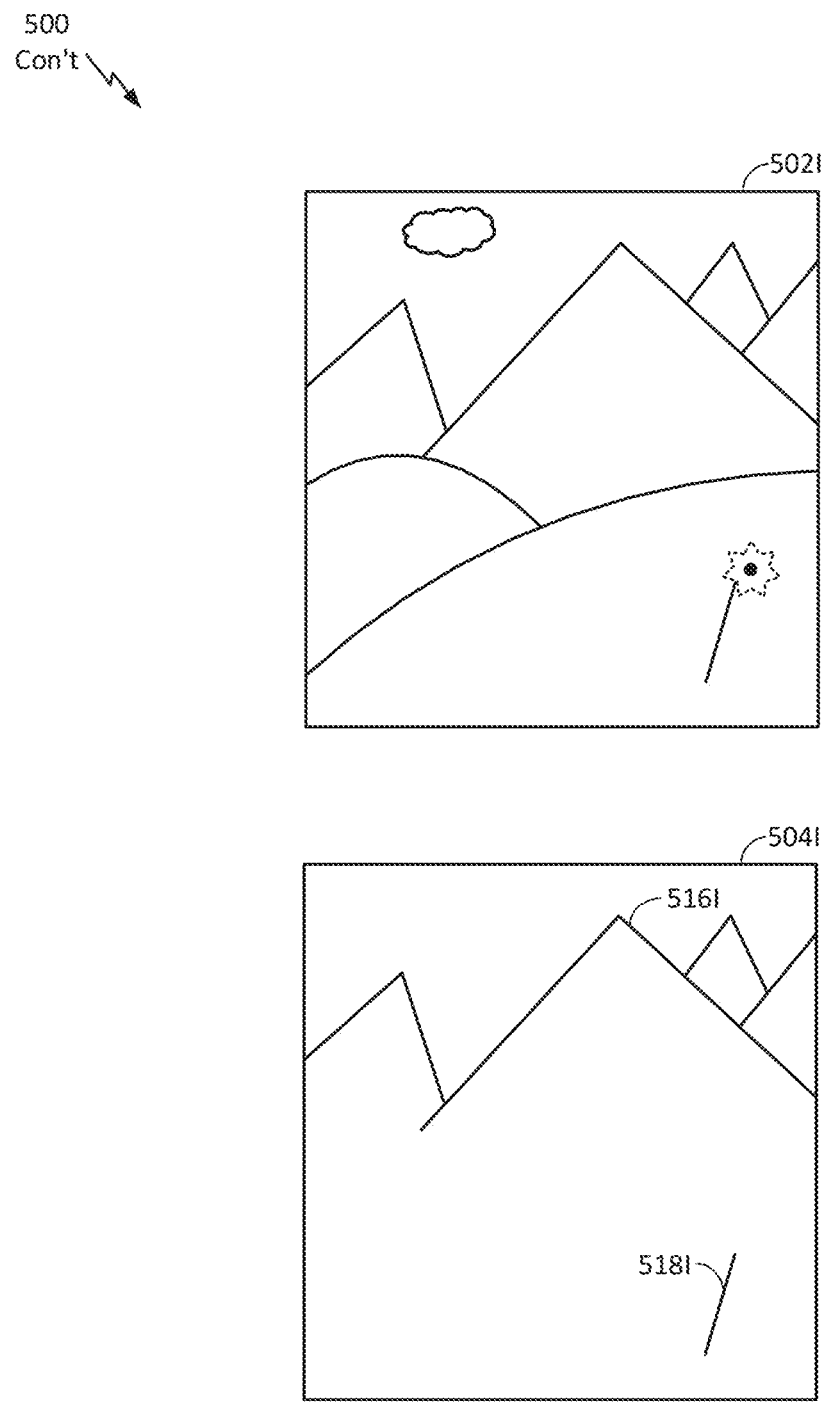
FIG. 5I depicts an image to provide an example using a series of images from the fixed-length video clip.
Figure 5J:
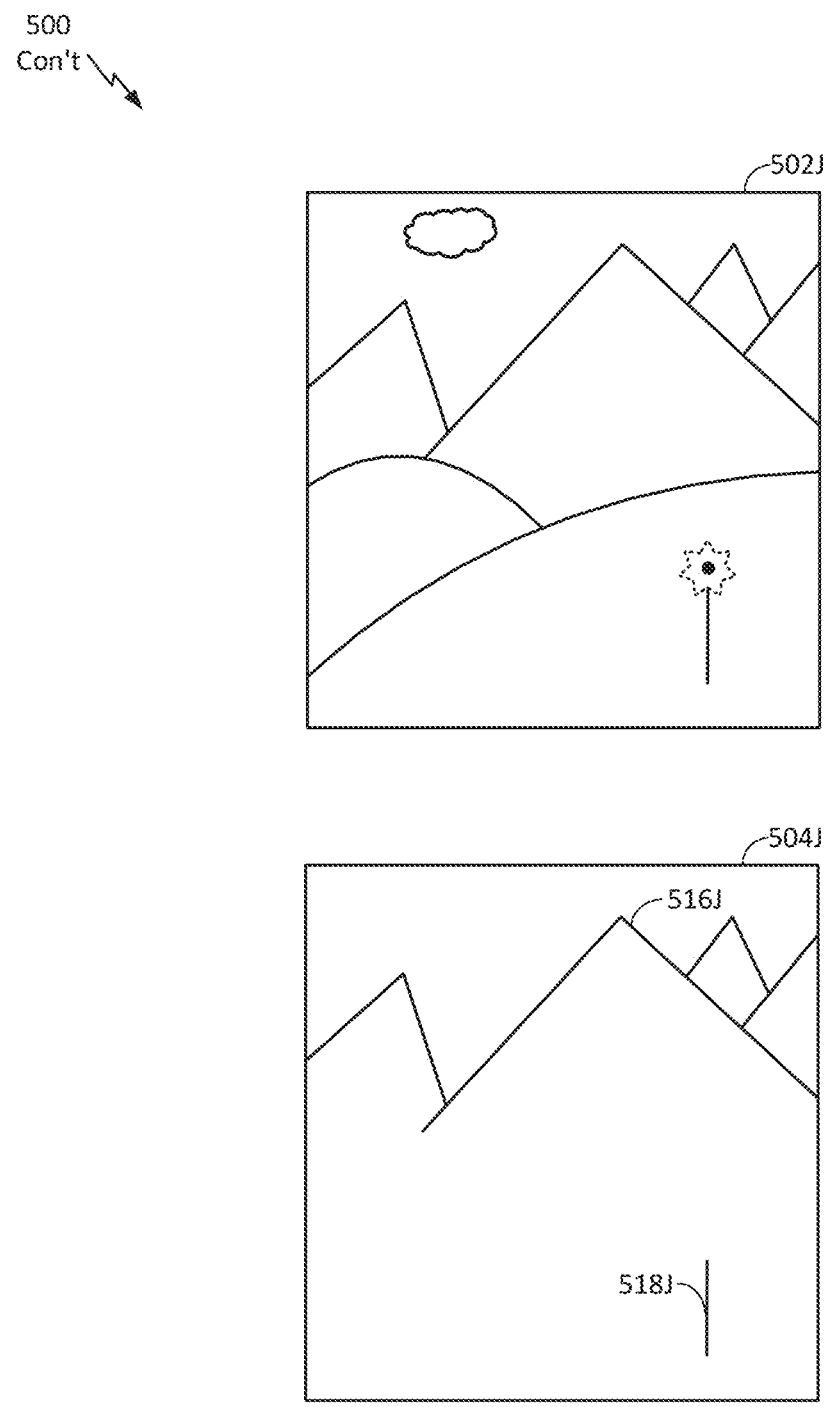
FIG. 5J depicts an image to provide an example using a series of images from the fixed-length video clip.

The series of images 502A-502J depict a scene with a cloud 506, grass 508A-508B, a flower 510 having a stem 512, and mountains 514. In the series of images 502A-502J, the flower 510 initially moves from far right, through center rear, to far left (FIGS. 5A-5E), then toward the right and in a forward direction (FIGS. 5F-5G) until the flower 510 reaches center forward (FIG. 5H). The flower 510 then moves rearward to the right (FIG. 5I) and finally back to center rear (FIG. 5J).

The series of edge mask image results 504A-504J depicts the images of the cloud 506, the grass 508A-508B, and a petal portion of the flower 510 do not yield sufficiently straight edges. However, the mountains 514 yield mountain straight edges 516A-516B, and the stem 512 yields stem straight edges 518A-518J.

Comparing images in the series of edge mask image results 504A-504J to each other in search of at least one suitable transition point for a looping video yields the mountain straight edges 516A-516B are substantially identical between all of the edge mask image results 504A-504J. Thus, the mountain straight edges 516A-516B do not limit the transition point to a specific combination of images in the images 502A-502J.

Comparing images in the series of edge mask image results 504A-504J to each other in search of the at least one suitable transition point also yields that at least some of the stem straight edges 518A-518J differ. However, this comparing also yields that some of the stem straight edges 518A-518J are at least similar.

There is not much difference between the stem straight edge 518B and the stem straight edge 518I, thus making the image 502B and the image 502I candidates for a first transition point. In other words, the stem straight edge 518B and the stem straight edge 518I are sufficiently similar to make the image 502B and the image 502I candidates for the first transition point.

Further, there is not much difference between the stem straight edge 518C and the stem straight edge 518J, thus making the image 502C and the image 502J candidates for a second transition point. In other words, the stem straight edge 518C and the stem straight edge 518J are sufficiently similar to make the image 502C and the image 502J candidates for the second transition point.

Optionally, two candidate looping videos can be rendered from the series of images 502A-502J. The first candidate looping video can have the first transition point corresponding to the image 502B and the image 502I. The second candidate looping video can have the second transition point corresponding to the image 502C and the image 502J. The one or more candidate looping videos can be displayed, stored, transmitted to at least one other device, the like, or a combination thereof.

In an embodiment, a display can display at least one of the first candidate looping video or the second candidate looping video. If multiple videos are rendered, each candidate looping video can be displayed on a display to enable visually comparing. Optionally, a selection of one or more looping videos from a group of candidate looping videos is received. The one or more selected looping videos can be displayed, stored, transmitted to at least one other device, the like, or a combination thereof.

Exemplary Computing Device

Any suitable computing system or group of computing systems can be used to implement the techniques and methods disclosed herein. For example, FIG. 6 is a block diagram depicting examples of implementations of such components. The computing device 600 can include a processor 602 that is communicatively coupled to a memory 604 and that is configured to execute computer-executable program code and/or access information stored in memory 604 or storage 606. The processor 602 can include a microprocessor, an application-specific integrated circuit ("ASIC"), a state machine, another processing device, or a combination thereof. The processor 602 can include one processing device or more than one processing device. The processor 602 can be coupled to a computer-readable medium storing instructions that, when executed by the processor 602, cause the processor 602 to perform at least a portion of an operation described herein. In an example, the processor 602 can include the computer-readable medium storing instructions that, when executed by the processor 602, cause the processor 602 to perform at least a portion of an operation described herein.

The memory 604 and the storage 606 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, any other medium from which a computer processor can read instructions, or a combination thereof. The instructions can include processor-specific instructions generated by a compiler, an interpreter, or both, from code written in any suitable computer-programming language, including, for example, C, C++, C#, R, Visual Basic, Java, Python, Perl, JavaScript, Julia, Scala, ActionScript, or a combination thereof.

The computing device 600 can also include an external device, an internal device, or a combination thereof, such as an input device, an output device, or a combination thereof. For example, the computing device 600 is shown with an input/output ("I/O") interface 608 which can be configured to receive input from an input device, provide output to an output device, or a combination thereof. For example, the I/O Interface 608 can be coupled to one or more video displays. A communication interface 610 can also be included in the computing device 600 and can include any device or group of devices suitable for establishing a wired or wireless data connection with one or more data networks. Non-limiting examples of the communication interface 610 include an Ethernet network adapter, a modem, the like, or a combination thereof. The computing device 600 can be configured to transmit messages as an electronic signal, an optical signal, or both, via the communication interface 610. A bus 612 can also be included to communicatively couple one or more components of the computing device 600.

The computing device 600 can be configured to execute program code that configures the processor 602 to perform at least a portion of an operation described herein. The program code can include one or more modules. The program code can be resident in the memory 604, storage 606, or any suitable computer-readable medium, and can be executed by the processor 602 or any other suitable processor. In some embodiments, the modules can be resident in the memory 604. In additional or alternative embodiments, one or more of the modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter can be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages can be used to implement the teachings contained herein in software to be used in programming or configuring a computing device.

Embodiments of the methods disclosed herein can be performed in the operation of such computing devices. The order of the blocks presented in the examples above can be varied—for example, blocks can be re-ordered, combined, and/or broken into sub-blocks. In an example, the blocks or processes can be performed in parallel.

Nothing stated or depicted in this application is intended to dedicate any component, step, block, feature, object, benefit, advantage, or equivalent to the public, regardless of whether the component, step, block, feature, object, benefit, advantage, or the equivalent is recited in the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values can, in practice, be based on additional conditions or values beyond those recited. Headings, lists, and numbering included herein are for ease of explanation only and are not meant to be limiting.

Within this description, the singular can portend the plural, where practicable. While the present subject matter has been described in detail with respect to specific embodiments thereof, it will be appreciated that those skilled in the art, upon attaining an understanding of the foregoing, can readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to a person having ordinary skill in the art.

What is claimed is:

1. A computer-implemented method for providing looping video, the method comprising:
   converting a first high-resolution video clip having a first plurality of high-resolution frames to a first lower-resolution video clip having a first plurality of lower-resolution frames;
   converting a second high-resolution video clip having a second plurality of high-resolution frames to a second lower-resolution video clip having a second plurality of lower-resolution frames;
   creating a first plurality of edgemaps of the first plurality of lower-resolution frames by performing edge detection on the first plurality of lower-resolution frames;

creating a second plurality of edgemaps of the second plurality of lower-resolution frames by performing edge detection on the second plurality of lower-resolution frames;
determining a candidate transition point from the first plurality of edgemaps and the second plurality of edgemaps; and
rendering a looping video from the first high-resolution video clip and the second high-resolution video clip, wherein the looping video has a start frame and an end frame corresponding to the candidate transition point.

2. The computer-implemented method of claim 1, further comprising splicing the first high-resolution video clip and the second high-resolution video clip at the candidate transition point.

3. The computer-implemented method of claim 1 wherein:
creating the first plurality of edgemaps comprises creating the first plurality of edgemaps of the first plurality of lower-resolution frames by performing edge detection on the first plurality of lower-resolution frames; and
creating the second plurality of edgemaps comprises creating the second plurality of edgemaps of the second plurality of lower-resolution frames by performing edge detection on the second plurality of lower-resolution frames.

4. The computer-implemented method of claim 1 wherein determining the candidate transition point comprises:
forming a confusion matrix that identifies pixels that are parts of edges using the first plurality of lower-resolution frames, the first plurality of edgemaps, the second plurality of lower-resolution frames and the second plurality of edgemaps;
generating a filtered confusion matrix by convolving the confusion matrix with a filter; and
determining the candidate transition point by identifying a minimum value in the filtered confusion matrix.

5. The computer-implemented method of claim 1, further comprising performing an optical-flow alignment on the looping video to align the start frame with the end frame.

6. The computer-implemented method of claim 1, further comprising constraining the determining the candidate transition point such that the looping video has at least one of a minimum duration or a maximum duration.

7. The computer-implemented method of claim 1, further comprising constraining the determining the candidate transition point to compare fewer than all of the frames in the first lower-resolution video clip and the second lower-resolution video clip.

8. The computer-implemented method of claim 1, further comprising displaying the looping video on a display.

9. A system for providing looping video, comprising:
a means for converting a first high-resolution video clip having a first plurality of high-resolution frames to a first lower-resolution video clip having a first plurality of lower-resolution frames;
a means for converting a second high-resolution video clip having a second plurality of high-resolution frames to a second lower-resolution video clip having a second plurality of lower-resolution frames;
a means for creating a first plurality of edgemaps of the first plurality of lower-resolution frames;
a means for creating a second plurality of edgemaps of the second plurality of lower-resolution frames;
a means for determining a candidate transition point from the first plurality of edgemaps and the second plurality of edgemaps; and
a means for rendering a looping video from the first high-resolution video clip and the second high-resolution video clip, wherein the looping video has a start frame and an end frame corresponding to the candidate transition point.

10. The system of claim 9, further comprising a means for splicing the first high-resolution video clip and the second high-resolution video clip at the candidate transition point.

11. The system of claim 9 wherein the means for determining the candidate transition point comprises:
a means for forming a confusion matrix that identifies pixels that are parts of edges using the first plurality of lower-resolution frames, the first plurality of edgemaps, the second plurality of lower-resolution frames and the second plurality of edgemaps;
a means for generating a filtered confusion matrix by convolving the confusion matrix with a filter; and
a means for determining the candidate transition point by identifying a minimum value in the filtered confusion matrix.

12. The system of claim 9, further comprising a means for performing an optical-flow alignment on the looping video to align the start frame with the end frame.

13. The system of claim 9, further comprising a means for displaying the looping video on a display.

14. A computer-implemented method for providing looping video, the method comprising:
converting a high-resolution video clip having a plurality of high-resolution frames to a lower-resolution video clip having a plurality of lower-resolution frames;
creating a plurality of edgemaps of the plurality of lower-resolution frames;
determining a candidate transition point from the plurality of edgemaps; and
rendering a looping video from the high-resolution video clip, wherein the looping video has a start frame and an end frame corresponding to the candidate transition point.

15. The computer-implemented method of claim 14, wherein creating the plurality of edgemaps comprises creating the plurality of edgemaps of the plurality of lower-resolution frames by performing edge detecting on the plurality of lower-resolution frames.

16. The computer-implemented method of claim 14 wherein determining the candidate transition point comprises:
forming a confusion matrix that identifies pixels that are parts of edges using the plurality of lower-resolution frames and the plurality of edgemaps;
generating a filtered confusion matrix by convolving the confusion matrix with a filter; and
determining the candidate transition point by identifying a minimum value in the filtered confusion matrix.

17. The computer-implemented method of claim 14, further comprising performing an optical-flow alignment on the looping video to align the start frame with the end frame.

18. The computer-implemented method of claim 14, further comprising constraining the determining the candidate transition point to compare fewer than all of the frames in the lower-resolution video clip.

19. The computer-implemented method of claim 14, further comprising displaying the looping video on a display.

20. The computer-implemented method of claim 14, further comprising at least one of:
storing the looping video in a memory device; or transmitting the looping video using an in/out interface device.

\* \* \* \* \*